(12) United States Patent
Chen

(10) Patent No.: US 7,681,516 B2
(45) Date of Patent: Mar. 23, 2010

(54) LIGHT-EMITTING HORN

(75) Inventor: Ming-Chang Chen, Tainan Hsien (TW)

(73) Assignee: Co-Union Industry Co., Ltd., Yung-Kang (TW)

( * ) Notice: Subject to any disclaimer, the term of this patent is extended or adjusted under 35 U.S.C. 154(b) by 98 days.

(21) Appl. No.: 12/157,820

(22) Filed: Jun. 13, 2008

(65) Prior Publication Data

US 2009/0308301 A1 Dec. 17, 2009

(51) Int. Cl.
*B62J 3/00* (2006.01)
*B62J 6/00* (2006.01)

(52) U.S. Cl. .................. 116/3; 116/166; 116/142 FP; 362/474

(58) Field of Classification Search .............. 116/3, 116/137 R, 142 FP, 148, 166; 362/473, 474; 446/184, 192, 193, 202, 216; 248/228.8, 248/229.17, 230.8, 689, 690, 691, 692; 403/321
See application file for complete search history.

(56) References Cited

U.S. PATENT DOCUMENTS

| | | | | |
|---|---|---|---|---|
| 581,743 A * | 5/1897 | Lucas et al. | ............. | 116/166 |
| 665,372 A * | 1/1901 | Rockwell | ............. | 116/166 |
| 702,160 A * | 6/1902 | Seebrook | ............. | 116/166 |
| 2,218,408 A * | 10/1940 | Meyerhoefer | ......... | 340/815.69 |
| 2,569,713 A * | 10/1951 | Garratt | .............. | 116/137 R |
| 2,703,359 A * | 3/1955 | Miller | ............. | 362/396 |
| 2,931,028 A * | 3/1960 | Propst | ............. | 340/815.69 |
| 4,768,741 A * | 9/1988 | Logsdon | .............. | 248/62 |
| 4,917,645 A * | 4/1990 | Amici et al. | ............ | 446/184 |
| 5,289,164 A * | 2/1994 | Novak | .............. | 340/574 |
| 6,422,912 B1 * | 7/2002 | Summers | ............ | 446/184 |
| 6,945,677 B2 * | 9/2005 | Fu | .............. | 362/473 |
| 7,070,295 B1 * | 7/2006 | Lee | .............. | 362/191 |
| 7,506,989 B2 * | 3/2009 | Tomassetti et al. | ........ | 362/86 |
| 2008/0163812 A1 * | 7/2008 | Lin | ............. | 116/137 R |

FOREIGN PATENT DOCUMENTS

| | | | |
|---|---|---|---|
| CN | 1590198 A | * | 3/2005 |
| CN | 2908293 Y | * | 6/2007 |
| EP | 8841 A1 | * | 3/1980 |

* cited by examiner

*Primary Examiner*—R. A. Smith
(74) *Attorney, Agent, or Firm*—Ladas and Parry LLP

(57) ABSTRACT

A horn includes a base adapted to be mounted to a bar, and a sound-generating unit. The base includes a support member and an elastic connecting member. The support member has a bottom portion adapted to be placed adjacent to the bar, a top portion extending upwardly from the bottom portion, and a hook protruding from the bottom portion. The elastic connecting member has an annular portion fittingly sleeved over the bottom portion of the support member, and a clamping portion extending from the annular portion and adapted to wrap around the bar and be releasably hooked onto the hook. The sound-generating unit includes a hollow horn body sleeved on the top portion of the support member, and a reed member disposed in the horn body and having opposite ends in fluid communication respectively with the air inside and the air outside the horn body.

8 Claims, 3 Drawing Sheets

LIGHT-EMITTING HORN

BACKGROUND OF THE INVENTION

1. Field of the Invention

This invention relates to a horn, more particularly to a light-emitting horn that can be strapped an object, e.g., a bicycle or a baby carriage.

2. Description of the Related Art

There are various types of horns suitable for installation on a bicycle or a baby carriage. However, none of these horns is capable of emitting light illumination and has a strapping mechanism that can securely and robustly strap onto the bicycle or on the baby trolley.

SUMMARY OF THE INVENTION

The object of the present invention is to provide a horn that has a strapping mechanism and that can emit light.

According to the present invention, a horn includes a base adapted to be mounted to a bar, and a sound-generating unit. The base includes a support member and an elastic connecting member. The support member has a bottom portion adapted to be placed adjacent to the bar, a top portion extending upwardly from the bottom portion, and a hook protruding from the bottom portion. The elastic connecting member has an annular portion fittingly sleeved over the bottom portion of the support member, and a clamping portion extending from the annular portion and adapted to wrap around the bar and be releasably hooked onto the hook. The sound-generating unit includes a hollow horn body sleeved on the top portion of the support member, and a reed member disposed in the horn body and having opposite ends in fluid communication respectively with the air inside and the air outside the horn body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
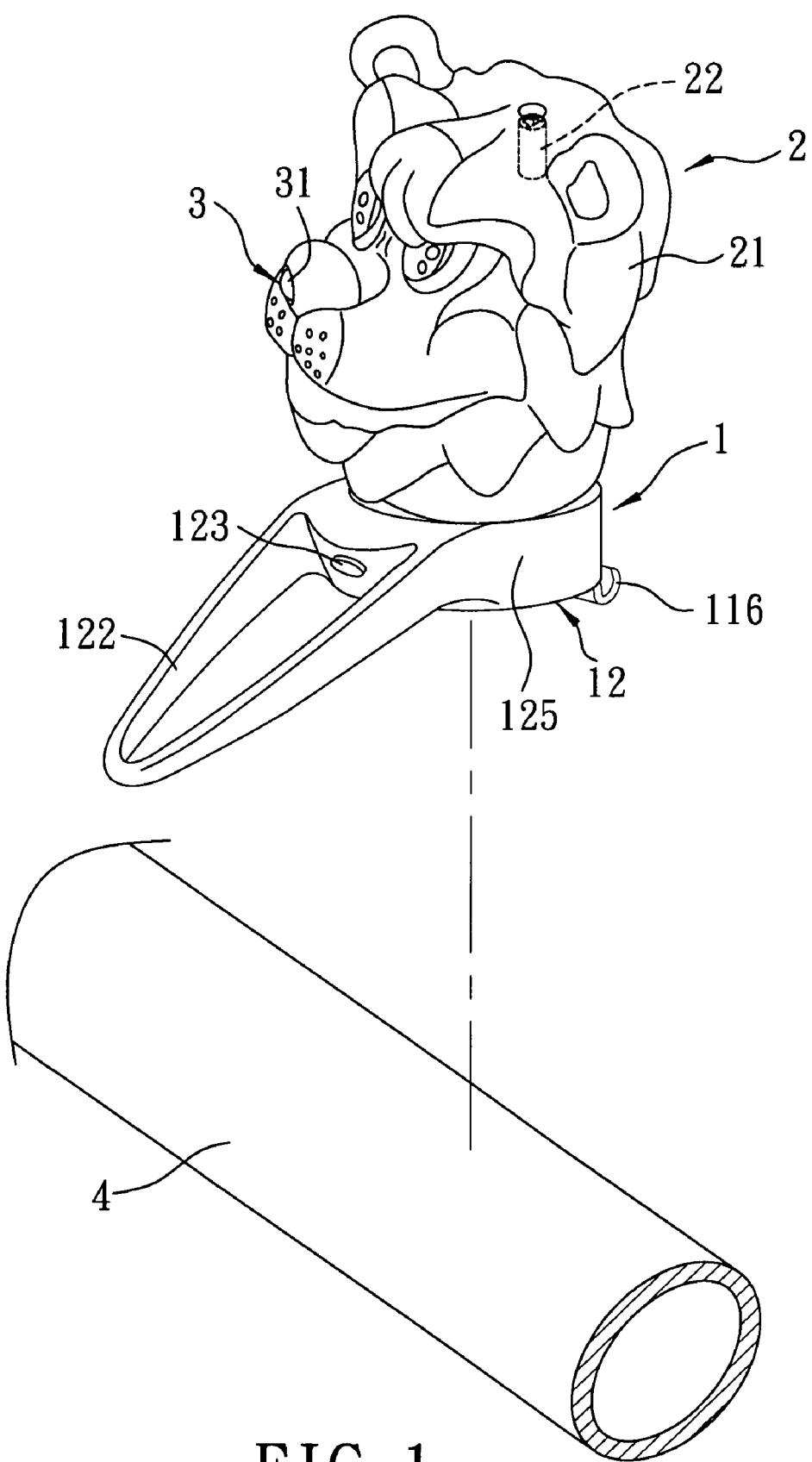
FIG. 1 is a perspective view of the preferred embodiment of a horn according to the present invention.
Figure 2:
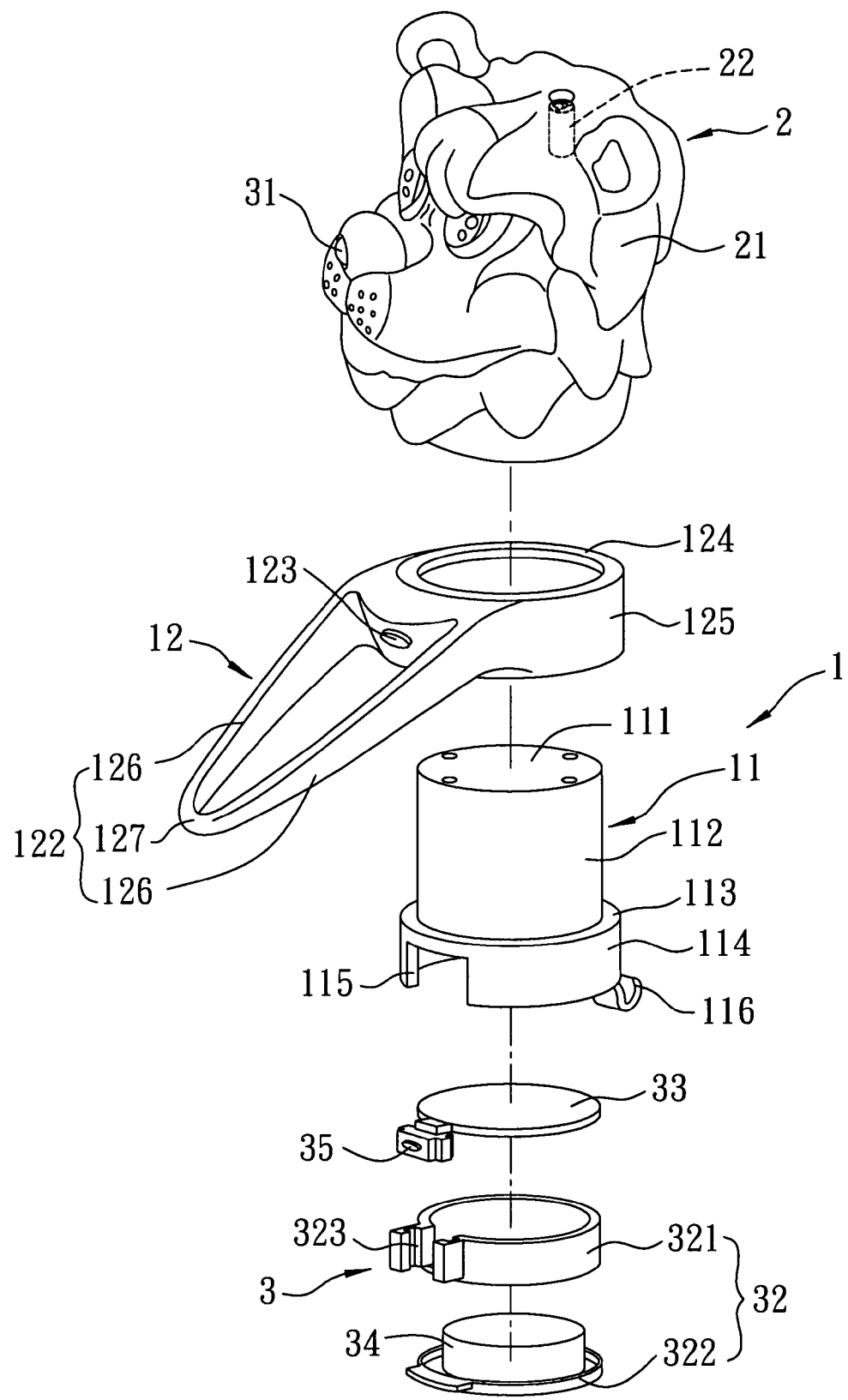
FIG. 2 is an exploded perspective view of the horn shown in FIG. 1.
Figure 3:
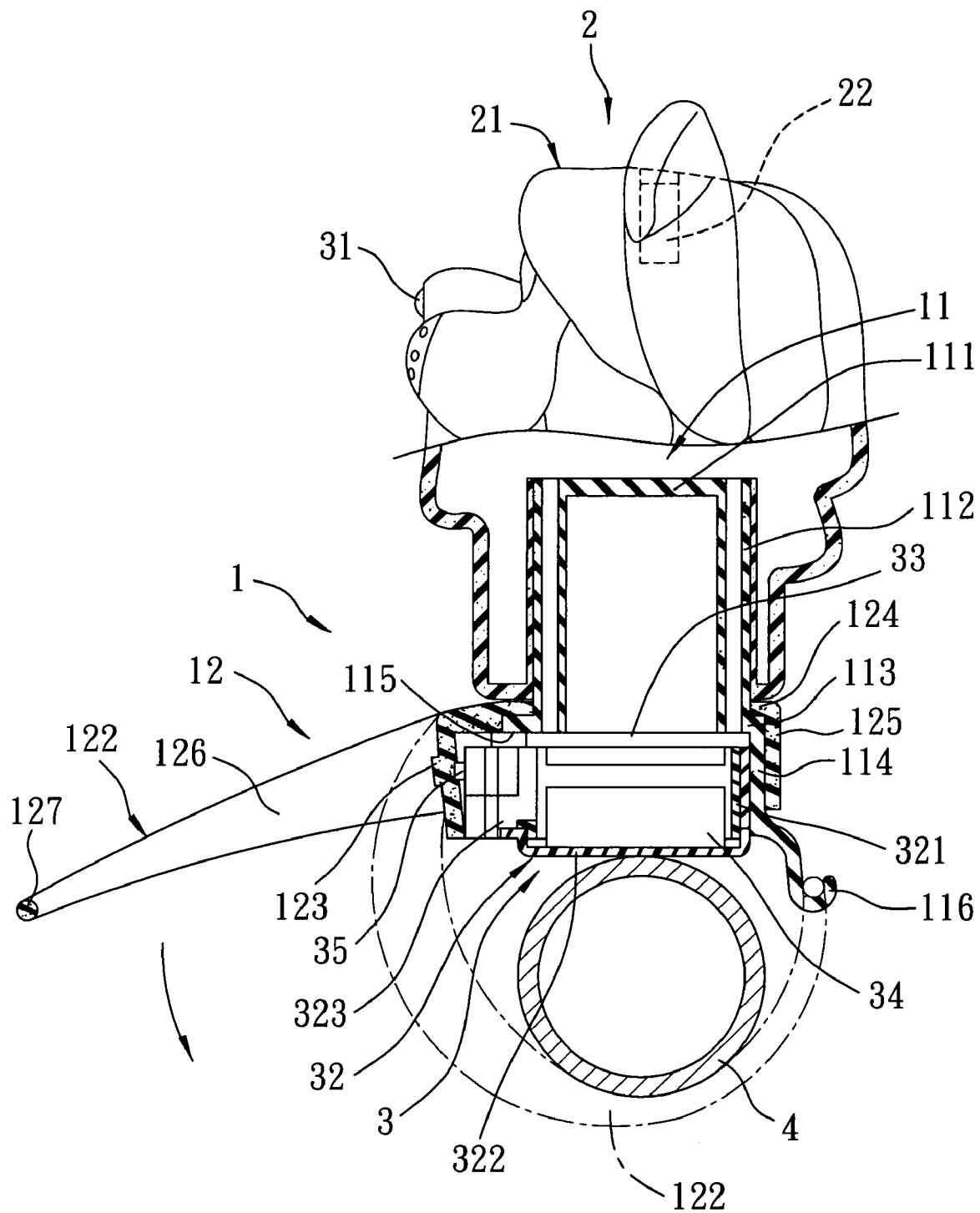
FIG. 3 is a schematic partly cross sectional view of the horn shown in FIG. 1.

The preferred embodiment of a horn according to the present invention is illustrated in FIGS. 1 to 3. The horn includes a base 1, a sound-generating unit 2, and a light-emitting unit 3. In this embodiment, the base 1 is adapted to be mounted to a bar 4 of a bicycle (not shown), and includes a support member 11 and an elastic connecting member 12. The support member 11 has a bottom portion adapted to be placed adjacent to the bar 4, a top portion extending upwardly from the bottom portion, and a hook 116 protruding from the bottom portion. The elastic connecting member 12 has an annular portion 125 fittingly sleeved over the bottom portion of the support member 11, and a clamping portion 122 extending from the annular portion 125 and adapted to wrap around the bar 4 and be releasably hooked onto the hook 116. The sound-generating unit 2 includes a compressible hollow horn body 21 sleeved on the top portion of the support member 11, and a reed member 22 disposed in the horn body 21 and having opposite ends in fluid communication respectively with the air inside the horn body 21 and the air outside the horn body 21. When the horn body 21 is squeezed, the horn generates a sound, just like any other ordinary horn device. Preferably, the clamping portion 122 and the horn body 21 are fabricated from a flexible material, such as rubber, plastic, silicone, etc. In this embodiment, the shape of the horn body 21 is a lion head, but should not be limited thereto.

The light-emitting unit 3 includes at least one light source 31 mounted on the horn body 21 of the sound-generating unit 2, a seat 32 mounted in the bottom portion of the support member 11, a circuit board 33 mounted on the seat 32 and coupled to the light source 31, a power source 34 mounted in the base 1 and coupled to the light source 31 and the circuit board 33 to provide electric power to the light source 31, and a switch 35 coupled to the circuit board 33 and operable to control on and off states of the light source 31. The circuit board 33 is electrically coupled to the light source 31 via a set of connecting wires (not shown) extending through the support member 11. In this embodiment, the power source 34 is a battery, and the light source 31 of the light-emitting unit 3 is a light-emitting diode and can be controlled to emit a steady light output, a flashing light output, a gradually dimmed light output, etc.

In this embodiment, the annular portion 125 of the connecting member 12 is formed with a protrusion 123. The switch 35 is registered with and disposed close to (e.g., in intimate contact with) the protrusion 123 to thereby be actuated through manipulation of the protrusion 123. The seat 32 of the light-emitting unit 3 includes a bottom wall section 322, and a side wall section 321 having a lower end disposed removably on the bottom wall section 322 and an upper end opposite to the lower end. The power source 34 is disposed on the bottom wall section 322 and is surrounded by the side wall section 321. The circuit board 33 is disposed on the upper end of the side wall section 321. The support member 11 of the base 1 is formed with a first opening 115, and the side wall section 321 of the light-emitting unit 3 is formed with a second opening 323. The switch 35 protrudes outwardly of the base 1 via the first and second openings 115, 323.

The top portion of the support member 11 includes a top wall 111, and a first peripheral wall 112 extending downwardly from a periphery of the top wall 111. The lower portion of the support member 11 includes a shoulder 113 extending outwardly from a bottom end of the first peripheral wall 112, and a second peripheral wall 114 extending downwardly from an outer periphery of the shoulder 113. The hook 116 extends outwardly from the second peripheral wall 114. The connecting member 12 further includes a flange 124 extending inwardly from an upper end of the annular portion 125 and resting on the shoulder 113. The clamping portion 122 includes a pair of arms 126 extending outwardly from the annular portion 125, and a catch portion 127 interconnecting distal ends of the arms 126. The arms 126 are adapted to wrap around the bar 4. The catch portion 127 is releasably hooked onto the hook 116. The horn body 21 of the sound-generating unit 2 is sleeved on the first peripheral wall 112 of the support member 11 and abuts against the flange 124 of the connecting member 12.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A horn comprising:
   a base adapted to be mounted to a bar and including
      a support member having a bottom portion adapted to be placed adjacent to the bar, a top portion extending upwardly from said bottom portion, and a hook protruding from said bottom portion, and
      an elastic connecting member having an annular portion fittingly sleeved over said bottom portion of said support member, and a clamping portion extending from said annular portion and adapted to wrap around the bar and be releasably hooked onto said hook; and
   a sound-generating unit including a hollow horn body sleeved on said top portion of said support member, and a reed member disposed in said horn body and having opposite ends in fluid communication respectively with the air inside said horn body and the air outside said horn body.

2. The horn of claim 1, further comprising a light-emitting unit that includes at least one light source mounted on said horn body of said sound-generating unit, and a power source mounted in said base and coupled to said light source to provide electric power thereto.

3. The horn of claim 2, wherein said light-emitting unit further includes a seat mounted in said bottom portion of said support member, a circuit board mounted on said seat and coupled to said power source and said light source, and a switch coupled to said circuit board and operable to control on and off states of said light source.

4. The horn of claim 3, wherein said annular portion of said connecting member is formed with a protrusion, said switch being registered with and disposed close to said protrusion to thereby be actuated through manipulation of said protrusion.

5. The horn of claim 3, wherein said seat of said light-emitting unit includes a bottom wall section, and a side wall section having a lower end disposed on said bottom wall section and an upper end opposite to said lower end, said power source being disposed on said bottom wall section and surrounded by said side wall section, said circuit board being disposed on said upper end of said side wall section.

6. The horn of claim 5, wherein said support member of said base is formed with a first opening, and said side wall section of said light-emitting unit is formed with a second opening, said switch being protruding outwardly of said base via said first and second openings.

7. The horn of claim 2, wherein said light source of said light-emitting unit is a light-emitting diode.

8. The horn of claim 1, wherein said top portion of said support member includes a top wall, and a first peripheral wall extending downwardly from a periphery of said top wall,
   said lower portion of said support member including a shoulder extending outwardly from a bottom end of said first peripheral wall, and a second peripheral wall extending downwardly from an outer periphery of said shoulder, said hook extending outwardly from said second peripheral wall,
   said connecting member further including a flange extending inwardly from an upper end of said annular portion and resting on said shoulder,
   said clamping portion including a pair of arms extending outwardly from said annular portion, and a catch portion interconnecting distal ends of said arms, said arms being adapted to wrap around the bar, said catch portion being releasably hooked onto said hook,
   said horn body of said sound-generating unit being sleeved on said first peripheral wall of said support member and abutting against said flange of said connecting member.

* * * * *